June 1, 1971 L. S. YAGGY 3,581,401

RULING ENGINE AND CARRIAGE INDEXING MECHANISM THEREFOR

Filed Feb. 3, 1969

INVENTOR.
LEON S. YAGGY,

Andrew M. Lesniak

ATTORNEY

United States Patent Office 3,581,401

Patented June 1, 1971

3,581,401
RULING ENGINE AND CARRIAGE INDEXING MECHANISM THEREFOR

Leon S. Yaggy, Oceanside, Calif., assignor to Hughes Aircraft Company, Culver City, Calif.

Filed Feb. 3, 1969, Ser. No. 795,789
Int. Cl. B43l 13/24
U.S. Cl. 33—19 29 Claims

ABSTRACT OF THE DISCLOSURE

A ruling engine incorporating a scribing mechanism and a carriage indexing mechanism. A stretch plate, carriage, and clamping devices are arranged so that the carriage may be indexed between scribing operations by selective clamping and declamping of portions of the carriage to the stretch plate during alternate stretching and relaxing of the stretch plate.

This invention relates to a carriage indexing mechanism and to a machine incorporating the same. More particularly, the invention relates to a ruling engine wherein a carriage is indexed relative to a scribing mechanism.

The manufacture of certain items involves the use of a ruling engine for marking or scribing numerous, parallel lines or slits on a workpiece. For example, ruling engines may be utilized in the production of storage tube target meshes, diffraction gratings and the like.

The purpose of this invention is to provide a ruling engine capable of marking or scribing numerous fine, equispaced lines or slits at very close intervals on a work blank, which is relatively inexpensive and relatively small in size.

The difficult task which a ruling engine may be called upon to perform will be appreciated if one considers, as an example, the application and utilization of a ruling engine embodying the instant invention in the course of producing targets for storage tubes.

A target may consist of a dielectric storage panel having a perforated metallic grid supported thereto. Such a panel may, for example, consist of a plate on the order of 5 inches per side having a surface area of 25 square inches. The metallic grid may, for example, consist of several thousand, parallel, metallic lines per inch in each of a pair of orthogonally related directions on the surface of the panel. Exemplarily such metallic lines may each be several inches long and a few microns or less wide, and spaced apart at about 10 microns center spacing.

In order to produce such a target, a coating of wax or other resist may be applied to a flat substrate. Orthogonal sets of parallel slits are formed in the resist to uncover areas of the substrate surface by scribing through the resist down to the substrate surface or by scribing into the resist partway to the substrate surface and then removing any residual resist at the bottom of the slits by suitable means such as, for example, ion beam sputtering.

Subsequently, a metal film may be evaporated onto the resist coating by conventional means and the exposed grid pattern of surface areas. The resist and the metal thereon may be removed to leave a grid pattern of metallic lines on the substrate.

If the substrate is of suitable dielectric material, the resultant item may be utilized directly as a tube target. If the substrate is of transparent glass or the like, it may be utilized as a photographic master which can be photographically replicated to make numerous tube targets.

The foregoing brief discussion regarding the fabrication of tube targets is merely exemplary and not in great detail since the techniques for performing the various steps enumerated are well known to those skilled in the art. Similar procedures may be performed to achieve the desired end product or similar products such as an independent metallic grid mesh not supported to a substrate.

Conventional ruling engines employ an intermittently rotated screw to index the ruling engine carriage carrying the work piece relative to a scribing mechanism. Consequently, each line or slit rulled is positioned with reference to the end of the screw rather than with reference to the previous ruled line or slit. Imperfect screw pitch, mechanical play in the linkage between the screw and the carriage, and differential expansions of the machine parts result in detrimental errors rendering the spacing between adjacent rulled lines or slits nonuniform. Successful production of items such as high quality targets or target meshes of the type mentioned earlier requires that such nonuniform spacing be rendered negligible to an arbitrarily fine degree.

It is critical that suitable means of indexing the carriage of the ruling engine be provided which outperforms or approximates the best results obtainable with the conventional ruling engine. The present invention which accomplishes this desideration does so in a significantly relatively inexpensive fashion.

Accordingly, it is an object of the invention to provide a machine incorporating a unique carriage indexing mechanism. It is another object of the invention to provide a ruling engine incorporating a carriage indexing mechanism including an elastically deformable or resilient member such as a stretch plate, a carirage, and clamping devices arranged to cooperate in such fashion that the carriage may be indexed past a scribing mechanism in the course of operation of the ruling engine.

These and other objects and advantages of the invention are achieved by selectively clamping and declamping portions of the carriage to the stretch plate while alternately stretching and relaxing the stretch plate during the time intervals between operation of the scribing mechanism.

A combination of machine elements is arranged so that a first member capable of cyclical elastic deformation is utilized to index one machine member relative to another machine member by providing first means for cyclically varying the deformation state of the first member and second means for selectively coupling said first member to the one machine member during operation of the first means.

The aforementioned other features and objects of the invention will become apparent by reference to the following description taken in conjunction with the accompanying drawings in which.

Figure 1:
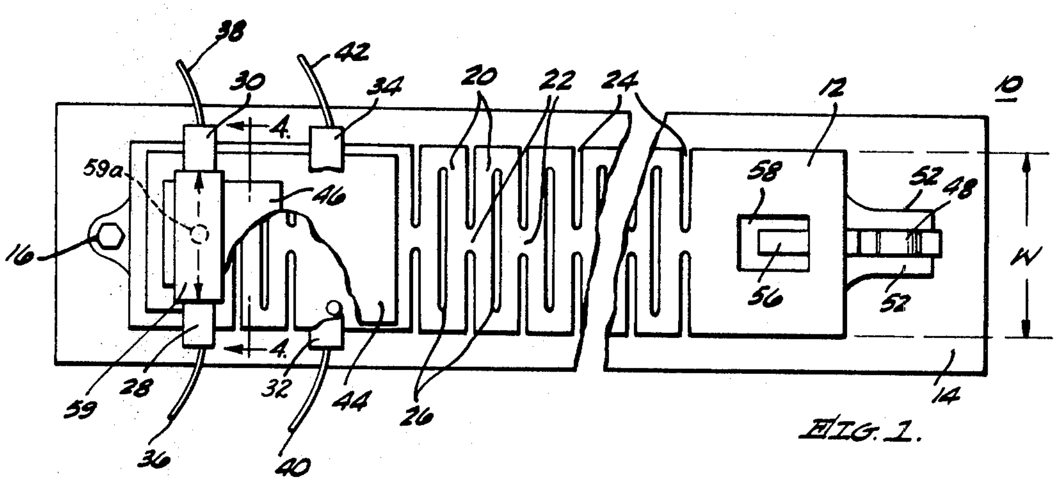
FIG. 1 is a partially cut away plan view illustrating a ruling engine embodying the invention.
Figure 2:
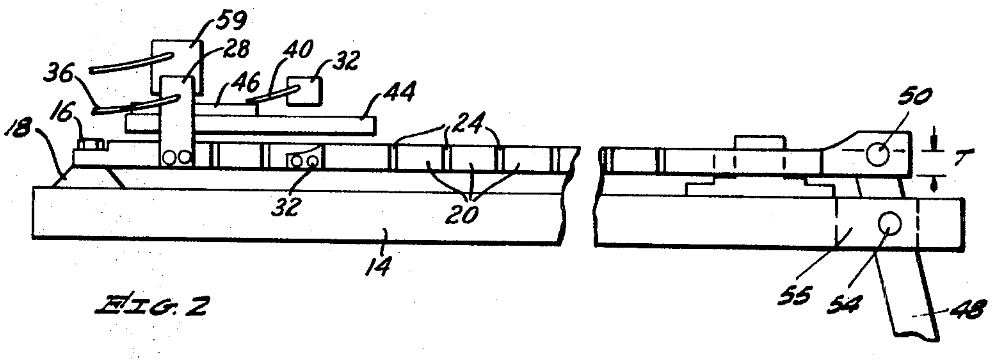
FIG. 2 is a partially cutaway side elevational view of the ruling engine of FIG. 1.

Referring now to the drawings, FIGS. 1 and 2 show a ruling engine 10 embodying the invention wherein stretch plate 12 is attached to base member 14 by suitable means such as bolt 16 screwed into a threaded aperture within boss 18 which is mounted on base member 14.

Base member 14 is mounted on a granite block (not shown) or other massive support means in order to effectively isolate the ruling engine from environmental vibrational disturbances. Stretch plate 12 may consist of Inconel in which peripheral slots 24 and central slots 26 have been formed by electrical discharge machining in order to define web portions 20 and bridge portions 22. Other suitable material may be used and the slots and grooves formed by other conventional techniques. Web portions 20 constitute deflectable beams of uniform width which are symmetrically arranged about the longitudinal body axis of stretch plate 12 and which increase the effective range of elastic deformation which may be imposed upon the stretch plate.

Clamping devices 28, 30, 32 and 34 are attached to stretch plate 12. If desired the clamp devices 28 and 30 may be secured to the base member 14 or other suitable support means and need not necessarily be secured to the stretch plate 12. Each of these clamping devices 28–34 may comprise a bottom clamp jaw having a convex jaw surface vertically spaced from an upper reciprocable clamp jaw. The upper clamp jaw may consist of a pressure pad supported by a diaphragm in a hermetic chamber. The upper clamp jaws are movable downwardly into clamping position upon application of pneumatic pressure to the diaphragm by means of compressed air conveyed from an air pump (not shown) through a suitable valve control mechanism (not shown) by pneumatic lines or tubing 36, 38, 40, and 42. Hydraulic, rather than pneumatic means may be employed for this purpose.

Carriage 44, shown partially cut away to reveal the underlying area of stretch plate 12, comprises a flat elongated glass plate upon which a workpiece 46, such as the previously mentioned resist coated transparent glass plate, rests. The material comprising carriage 44 preferably is selected so as to have a thermal coefficient of expansion matching that of workpiece 46 to reduce or eliminate adverse effects of changes in the environmental temperature.

Figure 4:
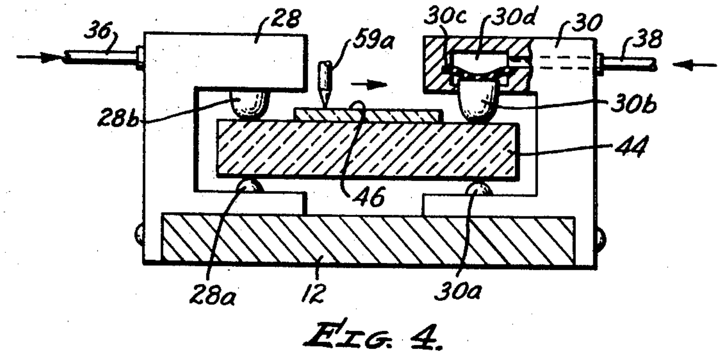
FIG. 4 is a transverse sectional view taken along line 4—4 of FIG. 1 wherein a partially cut away view of a clamping device is shown.

A general knowledge of suitable clamping device structure may be gained from FIG. 4 wherein the carriage 44, with the workpiece 46 supported therein, is shown gripped by the clamping devices 28 and 30, it being understood that gripping of the carriage 44 by the clamping devices 32 and 34 is similarly accomplished. The clamping device jaw structure earlier described is of a conventional nature, the details of which are of no particular interest. By way of example the clamping device 30 includes a bottom clamp jaw 30*a*, an upper clamp jaw 30*b*, a diaphragm 30*c*, and a hermetic chamber 30*d*, the diaphragm and hermetic chamber being shown by cutting away part of the clamp device 30. The clamp devices 28, 32, and 34 may be similarly constructed and in FIG. 4, bottom and upper clamp jaws 28*a* and 28*b* of the clamp device 28 are shown. Also depicted in FIG. 4 is a tool 59*a* of the scribing mechanism 59 shown traversing the workpiece 46.

Lever 48 is attached to stretch plate 12 by means of pin 50 passing through an aperture in lever 48 coaxially aligned with apertures in stretch plate ears 52. Lever 48 extends through slot 55 in base member 14 and is pivoted upon pin 54 which extends through coaxially aligned apertures in lever 48 and base member 14. The cut away portion of lever 48 (not shown) is driven by a pneumatic actuator coupled to the previously mentioned compressed air pump by suitable valving and pneumatic or hydraulic pressure lines or tubes.

Stop member 56, mounted on base member 14, extends through stretch plate slot 58. The difference between the longitudinal dimension of stop member 56 and that of slot 58 precisely determines the extent to which stretch plate 12 may be deformed or stretched when lever 48 is actuated to apply a deforming load thereto. This arrangement permits pretensioning of stretch plate 12, thus rendering the operation of stretch plate 12 more precise.

Scribing mechanism 59 is indicated schematically since various conventional scribing mechanisms may be utilized. One such scribing mechanism incorporates a carriage supported diamond chisel or tool 59*a* movable in transverse direction relative to the longitudinal body axis of stretch plate 12. The tool 59*a*, embodied in schematically depicted mechanism 59, is represented by a dotted circle, and dotted arrows indicate the ability of the tool to move in transverse directions. Details of the way in which the tool is mounted on the carriage of the mechanism 59 so as to be movable therewith are deleted as being of no special interest. The scribing mechanism 59 is secured in place in any suitable way as by, for example, attachment means integral therewith secured to the base member 14. After each indexing motion of the carriage 44 this tool or mechanism is operable to scribe a slit into the resist coating of the workpiece 46.

Referring further to the stretch plate 12, shown in FIGS. 1 and 2, the section thereof below the scribing mechanism 59 and adjacent the bolt 16 can contain slots 24, 26 for defining web and bridge portions 20, 22 thereat or can be devoid of slots 24, 26. In either instance the ruling engine operation described hereinafter remains essentially the same. In the first instance the web portions 20 beneath the scribing mechanism 59 can be deflected or bent to the same degree as the web portions 20 elsewhere in the stretch plate 12 during the operation of the ruling engine.

Figure 3:
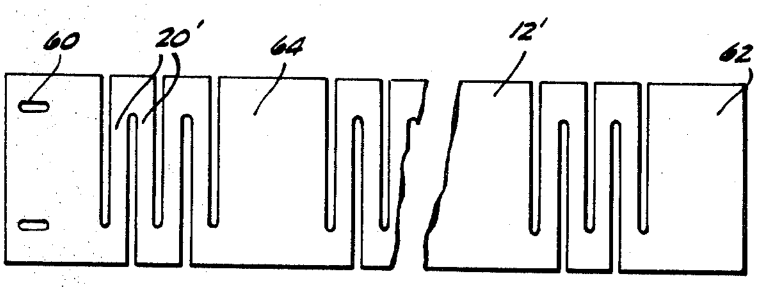
FIG. 3 is a partially cut away plan view showing a modification of the preferred embodiment of the stretch plate utilized in the ruling engine shown in FIGS. 1 and 2.

FIG. 3 shows an alternate form of stretch plate 12′ consisting of deflectable beams 20′ defined by transverse peripheral slots extending in interdigitated fashion from opposite sides of stretch plate 12′. Slots 60 afford a means by which stretch plate 12′ may be precisely positioned and oriented, and then clamped to base member 14 to insure uniform longitudinal loading thereof. Stretch plate area 62 is devoid of slots to further facilitate uniform loading upon stretching of plate 12′. Stretch plate area 64 is devoid of slots and is adapted to accommodate the mounting thereon of clamping devices 32 and 34.

Ruling engine operation is as follows:

Initially carriage 44 is inserted between the clamping jaws of clamping devices 28–34 to rest upon the bottom clamping jaws thereof. The ruling engine is started up and operated for a period of time such as 30 minutes in order to stabilize the operating conditions. Resist coated workpiece 46 is accurately positioned on carriage 44 and secured in place by means such as wax fillets around the workpiece periphery.

Compressed air applied to the diaphragms of clamping devices 32 and 34 actuate the upper clamp jaws thereof in unison whereupon carriage 44 is securely clamped between the clamping jaws. Lever 48 is pivoted about pin 54 whereupon a longitudinally directed deforming load is applied to stretch plate 12. Resultant stretching of stretch plate 12 occurs as web portions 20 are deflected or bent, each to the same degree, until further stretching of stretch plate 12 is precluded by stop member 56. Clamping devices 32 and 34 are moved laterally in straight paths parallel to the stretch plate axis of elongation by the underlying portions of the stretch plate to which they are mounted. Accordingly, carriage 44 is indexed along a rectilinear path by the moving clamping devices 32 and 34.

The distance the clamping devices 32 and 34, and consequently carriage 44, travel is proportional to the amount of elongation of stretch plate 12 or change in deformation state thereof. This proportion is determined by the longitudinal position of clamping devices 32 and 34 on stretch plate 12 as is obvious by inspection.

Clamping devices 28 and 30 are actuated in unison to clamp carriage 44 between the jaws thereof, and clamping devices 32 and 34 are deactuated in unison to release or declamp the carriage therefrom. Subsequently lever 48 is deactuated whereupon it is returned to its initial position thereby allowing stretch plate 12 to relax and return to its initial deformation state.

Clamping pressure is now applied in unison by all four clamping devices to hold the carriage 44 stationary while the scribing mechanism 59 is actuated to scribe a slit within the resist on workpiece 46. This completes a single cycle of machine operation which occurs in a period of about 6 seconds. Each time this cycle is repeated the carriage is indexed and scribed in the manner indicated.

After the desired number of parallel slits have been scribed into the resist, workpiece 46 may be repositioned on carriage 44 with an orientation orthogonal to the original orientation, again secured to carriage 44, and a second set of slits scribed in the resist. After the second set has been formed the resulting article, having a grid of orthogonally intersecting sets of slits thus formed in the resist, may be utilized as previously indicated to obtain the desired end product or item.

While various specific features incorporated in the invention have been described it will be appreciated that various modifications thereof will be readily apparent to those skilled in the mechanical arts. Thus, for example, clamping devices 28 and 30 may be attached to base member 14 or other suitable support means. The stretch plate itself may consist of a solid, nonperforated body of resilient material deformable or stretchable to a degree sufficient for satisfactory operation. It is not necessary that the stretch plate be pretensioned when relaxed. The spacing between parallel scribing lines or slits can be readily altered as described by changing the stroke of lever 48 or by indexing carriage 44 several times for each scribing operation. Other forms and shapes of elastically deformable members may be utilized in lieu of the stretch plate which may be deformed by compressing along the body axis or bending about a body axis rather than by stretching along a body axis as shown. Accordingly, the invention as described is by way of illustration and not limitation.

What is claimed is:

1. A machine having first and second machine members arranged so that at least one of said members may be moved relative to the other of said members comprising:

first means capable of cyclical elastic deformation;
second means for cyclically varying the deformation state of said first means; and
third means being at least partially secured to said first means for selectively, intermittently coupling said first means to said one machine member during operation of said second means to produce indexing of said one machine member relative to the other said member.

2. The machine of claim 1 wherein said third means comprises a clamping device arrangement operably associated with said first means and said one machine member for supporting and selectively gripping said one machine member and further comprising actuator means for concurrently operating said first means and said clamping device arrangement so that said one machine member is indexed along a rectilinear path.

3. The machine of claim 1 wherein said third means includes a plurality of clamping devices each independently operable to alternately grip and release said one machine member and wherein said first means includes an elastically deformable member coupled to at least one of said clamping devices so that said at least one clamping device is movable upon elastic deformation of said elastically deformable member whereby said carriage may be indexed when said plurality of clamping devices and said elastically deformable member are operated in a predetermined fashion.

4. The machine of claim 1 wherein said third means includes means for alternately gripping and releasing selected portions of said one machine member to alternately couple and decouple said one member to said first means to thus index said one member a distance proportional to the change in deformation state of said first means.

5. The machine of claim 1 wherein said one machine member is a carriage.

6. The machine of claim 1 wherein the other said machine member includes a work tool arranged adjacent said carriage.

7. The machine of claim 1 wherein said first means comprises a stretch plate.

8. The machine of claim 1 wherein said third means includes means for supporting said one machine member.

9. The machine of claim 1 wherein said one machine member is a carriage having a surface for receiving work and wherein said first means includes a stretch plate and wherein said third means includes first and second longitudinally spaced pairs of clamping devices flanking said stretch plate and wherein said carriage is removably disposed between the clamping jaws of the clamping devices.

10. The machine of claim 1 wherein said third means comprises fourth means attached to said first means for moving said one machine member upon variation of the deformation state of said first means from a first state of deformation and further comprises fifth means arranged to hold said carriage substantially stationary during return of said first means to the first state of deformation.

11. The machine of claim 1 further including means for quiescently maintaining said first means in a first state of deformation.

12. A carriage indexing mechanism comprising:

a carriage;
first means capable of cyclical elastic deformation;
second means for cyclically varying the deformation state of said first means; and
third means being at least partially secured to said first means for selectively and intermittently coupling said carriage to said first means during operation of said second means to index said carriage.

13. A carriage indexing mechanism, for unidirectionally advancing a carriage laterally along a rectilinear path in a series of uniform incremental displacements, comprising, plural clamping means supporting said carriage each being operable to grip and release said carriage,
resilient means mechanically coupled to at least a portion of said plural clamping means so that resilient deformation of said resilient means while said carriage is gripped by said portion of said plural clamping means is effective to produce lateral movement of said carriage when said carriage is released by another portion of said plural clamping means; and
actuator means being coupled to said resilient means for resiliently deforming said resilient means.

14. A carriage indexing mechanism comprising:

first and second clamping means supporting a carriage;
one of said clamping means being coupled to elastically deformable means for movement back and forth along a path upon cyclical variation in the deformation state of said elastically deformable means; and
said first and second pairs of clamping means being operable in timed relation to the aforesaid variation to respectively grip and release respective carriage portions and thus intermittently, unidirectionally advance said carriage along a path.

15. The carriage indexing mechanism of claim 14 wherein each of said first and second clamping means includes a pair of clamping devices operable in unison to concurrently grip and release respective carriage portions.

16. The carriage indexing mechanism of claim 14 further including actuator means for operating said clamping means so that the carriage is gripped by said first clamping means, then by said second clamping means, and then by both said first and second clamping means during successive portions of the time interval during which the aforesaid cyclical variation occurs.

17. A machine comprising:

a stretch plate mounted adjacent a base member;
a carriage plate for receiving work;
first and second longitudinally spaced pairs of clamping devices each comprising individual clamping devices flanking said stretch plate and having respective clamping jaws arranged so that said carriage plate is removably disposable therebetween, the arrangement being such that said stretch plate and said clamping devices may cooperate to index said carriage plate in a longitudinal direction.

18. In a machine:

a carriage for supporting and moving a workpiece past a marking tool;

an elastic member capable of cyclical elastic deformation;

coupling and decoupling means for operably coupling and decoupling said carriage to and from said member;

said coupling and decoupling means including first means, attached to said member and movable thereby for coupling said carriage to said member and for moving said carriage from an initial position upon variation of the deformation state of said member from a first to a second deformation state and including second means for decoupling said carriage from said member to prevent return of said carriage to the initial position during return of said member to the first deformation state.

19. A machine comprising:

a carriage having a surface adapted to receive work;

a marking device having a work tool operably positioned adjacent said surface;

an elastically deformable member;

actuator means connected to said elastically deformable member; and means for alternately coupling and decoupling said carriage to said elastically deformable member in such fashion that said carriage is caused to advance a distance proportional to the change in deformation state of said elastically deformable member when said carriage is coupled thereto.

20. A machine comprising:

a resiliently deformable member secured at a first location to be a support member;

an actuator for applying deformation loads to said resiliently deformable member at a second location;

a first pair of clamps each mounted on said resiliently deformable member at opposite sides of an axis passing through said first and second locations;

a second pair of clamps each mounted on said resiliently deformable member at opposite sides of said axis;

the individual clamps each having mutually opposed stationary and movable clamp faces;

said pairs of clamps being spaced so that a carriage is commonly supportable thereby alongside said resiliently deformable member; and the arrangement being such that carriage indexing may be produced by varying the state of deformation of said resiliently deformable member from an initial state of deformation while clamping said carriage between the clamp faces of said first pair of clamps and subsequently declamping said carriage from said first pair of clamps while clamping said carriage between the clamp faces of said second pair of clamps while returning said resiliently deformable member to its initial state of deformation.

21. The machine of claim 20 further comprising tool means adjacent said carriage for performing a work operation on carriage supported work during the time intervals between carriage indexing.

22. The machine of claim 21 wherein said pairs of clamps are adapted to concurrently clamp said carriage during such work operation.

23. A machine subcombination comprising:

a massive base member;

a flat, elongated, deformable member affixed near one end to said base member;

actuator means mechanically connected near the other end of said bar for longitudinally deforming said deformable member to vary the length thereof;

a first pair of clamps mounted on said base member with the respective clamps thereof disposed in transverse spaced relation relative to the longitudinal dimension of said deformable member;

a second pair of clamps mounted on said deformable member with the respective clamps thereof disposed in transverse spaced relation relative to the longitudinal dimension of said bar member;

each clamp having a clamp jaw co-planar with the clamp jaw of each other clamp to support a carriage; and said clamps being disposed to permit lateral indexing of such carriage in a direction parallel to the longitudinal dimension of said deformable member when said pairs of clamps are operated in a predetermined fashion during application of intermittent, cyclically varying deformation forces to said deformable member by said actuator means.

24. A machine subcombination comprising:

a stretch plate having an axis of elongation;

first and second clamps flanking said stretch plate arranged along a first line transverse to said axis;

third and fourth clamps flanking said stretch plate along a second line transverse to said axis of elongation, said clamps being arranged to laterally support a carriage;

actuator means for varying the dimension of said stretch plate along said axis; and said respective clamps being power operable to grip and release said carriage intermittently during operation of said actuator means so that said carriage may be indexed in a direction substantially parallel to the direction of said axis.

25. A ruling engine comprising:

a carriage;

an elastically deformable member;

actuatable means operable to produce controlled elastic deformation of said member;

a marking device having a marking tool disposed adjacent said carriage for marking a workpiece secured to said carriage; and means for selectively clamping selected portions of said carriage and said member so that said carriage is advanced to a new position upon elastic deformation of said member and is maintained at the new position upon deactuation of said actuatable means.

26. A machine comprising:

a carriage mounted for indexing along a given direction in individual cooperating clamp devices and being so mounted in clamped or unclamped relation thereto;

a tool mounted in position to act upon work located on said carriage upon tool movement in a direction transverse to said given direction; and indexing means for indexing said carriage in certain time spaced time intervals between time intervals of tool movement comprising (a) an elastically deformable member coupled to an actuator in an arrangement such that said actuator is operable to elastically deform said elastically deformable member in time intervals between said time intervals of tool movement, (b) an arrangement wherein at least two of said clamp devices are secured to said elastically deformable member and wherein another two of said clamp devices are secured to a portion of said machine so that said first mentioned two clamp devices are movable in unison relative to said another two clamp devices when said actuator effects a change in elastic deformation of said elastically deformable member, and (c) all of said clamp devices are arranged so that repetitive intermittent cyclic elastic deformations of said elastically deformable member will effect successive incremental displacements of said carriage unidirectionally in said given direction during alternate ones of said certain time spaced time intervals between said time intervals of tool movement by clamping said carriage by said another two clamp devices concurrently and by unclamping of said carriage by the first mentioned two clamp devices.

27. A ruling engine comprising:

a carriage for receiving work to be marked at spaced intervals;

a marking device disposed adjacent the carriage and having a tool for making marks on work secured to said carriage;

an elastically deformable member;

actuator means for alternatively varying the deformation state of said member between first and second states;

plural clamping means for holding said carriage each of which may be operated to grip and release respective portions of said carriage;

individual clamping means of said plural clamping means being secured to said elastically deformable member for carrying said carriage when gripped solely thereby a distance of incremental displacement dependent upon the extent of the variation between the aforementioned deformation states; and said actuator means and said plural clamping means being adapted for synchronous operation whereby work secured on said carriage may be repositioned relative to said marking device by effecting successive carriage displacements so that said tool may be operated to make successive marks on such work at spatial intervals equal to one or more integral multiples of a single carriage displacement.

28. A carriage indexing mechanism comprising:

a carriage to be unidirectionally advanced along a rectilinear path in a series of uniform incremental displacement steps;

resilient means for repetitively undergoing resilient deformation between different deformation states;

actuator means being coupled to said resilient means to repeatedly intermittently deform said resilient means;

first clamping means secured to said resilient means and arranged to support a portion of said carriage in either clamped or not clamped relation;

second clamping means secured to a portion of said mechanism and arranged to support another portion of said carriage in either clamped or not clamped relation;

said first and second clamping means being relatively disposed so that said first clamping means will be moved parallel to said path relative to said second clamp means when said resilient means is resiliently deformed;

said carriage being supported by said first and second clamping means so that movement of said first clamping means upon resilient deformation of said resilient means by said actuator when said carriage is clamped by said first clamping means and not clamped by said second clamping means will effect a displacement of said carriage relative to said second clamping means;

said first and second clamping means being operable to clamp and not clamp said carriage in a time interrelated fashion such that successive carriage displacements as aforesaid may be accomplished by repeatedly resiliently deforming said resilient means.

29. A mechanism, for unidirectionally advancing a carriage along a rectilinear path in an intermittent motion, comprising:

an elastically deformable member;

actuator means for alternately applying and removing a deformation load to said member in repetitive intermittent fashion;

at least one power operable clamp mounted on said member having clamping jaws operable to grip said carriage while the deformation load is applied to said member and to release said carriage while the deformation load is removed from said member;

at least one other power operable clamp mounted on a portion of said mechanism in spaced relation to said at least one power operable clamp and having clamping jaws operable to grip said carriage while the deformation load is removed from said member and to release said carriage while the deformation load is applied to said member; and said power operable clamps being arranged and disposed relative to each other so that (a) said at least one power operable clamp while gripping said carriage is movable in one direction along a straight path during application of the deformation load to said member to displace said carriage an incremental distance along said path to an advanced position and is movable while releasing said carriage in a direction opposite to said one direction along said straight path during removal of the deformation load from said member and, (b) said at least one other power operable clamp while releasing said carriage is operable to allow said at least one power operable clamp to move in said one direction to displace said carriage as aforesaid and is stationary while gripping said carriage to hold said carriage stationary while said at least one power operable clamp moves in said direction opposite to said one direction along said straight path.

References Cited

UNITED STATES PATENTS

| | | | |
|---|---|---|---|
| 2,999,316 | 9/1961 | Wempe | 33—19(A) |
| 3,108,379 | 10/1963 | Aaron | 33—19(A) |

HARRY N. HAROIAN, Primary Examiner